April 3, 1962  R. J. POTTER ET AL  3,028,120
JET PROPULSION POWER PLANTS
Filed May 8, 1961
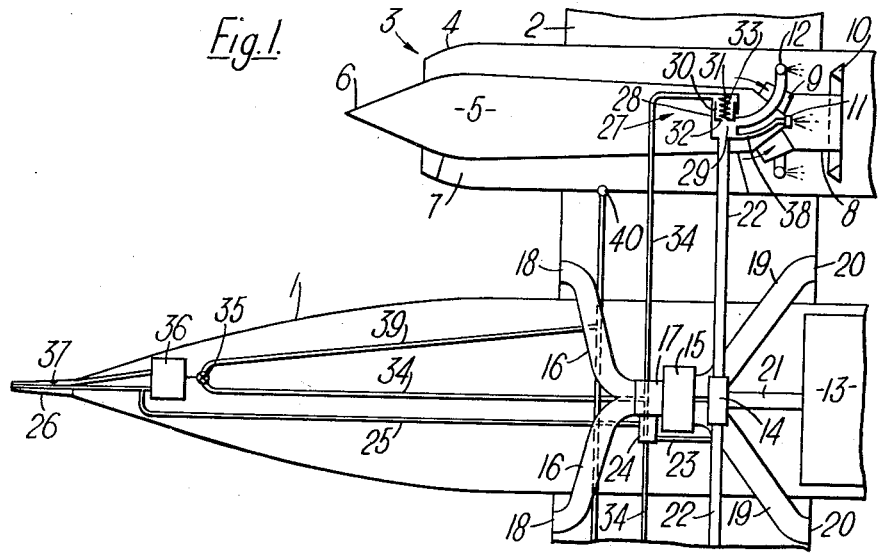
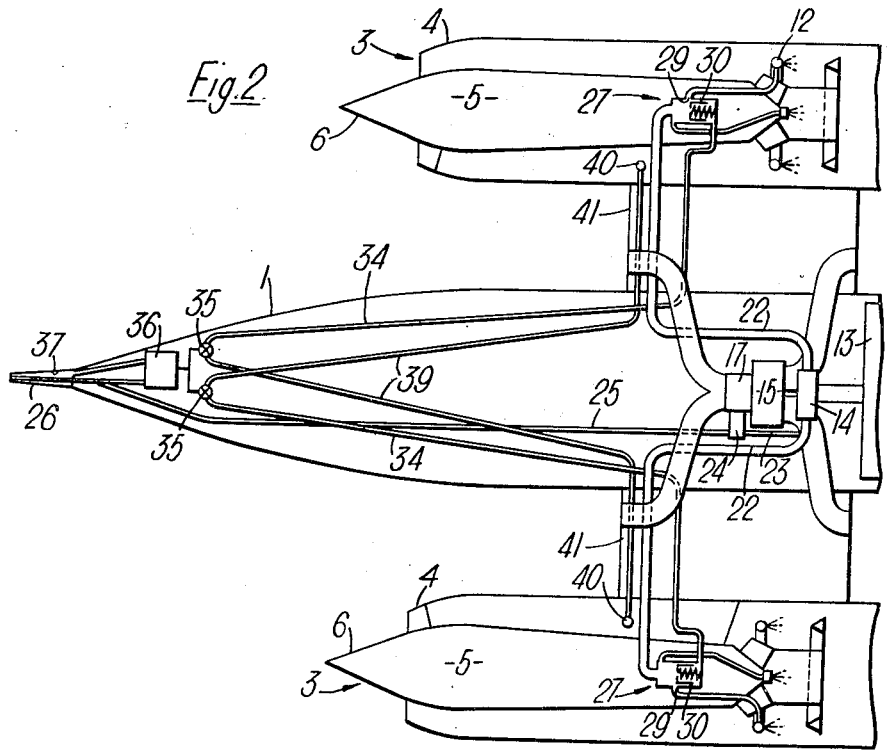
Inventors
RAYMOND JAMES POTTER & GORDON BRAY TOYNE
By Bailey, Stephens & Huettig
Attorneys

United States Patent Office 3,028,120
Patented Apr. 3, 1962

3,028,120
JET PROPULSION POWER PLANTS
Raymond James Potter and Gordon Bray Toyne, Bristol, England, assignors to Bristol Siddeley Engines Limited, Bristol, England, a British company
Filed May 8, 1961, Ser. No. 108,596
Claims priority, application Great Britain May 11, 1960
13 Claims. (Cl. 244—15)

This invention relates to jet propulsion power plants for service in conditions in which they will be subject to acceleration of a magnitude capable of producing substantial pressure heads in conduits conveying liquids in the plant, for example liquid fuel and hydraulic control system liquids.

According to the invention a jet propulsion power plant for use in conditions of the kind described comprises a liquid fuel burning engine, a fuel metering valve including relatively movable parts defining a variable area metering orifice, means for supplying fuel under pressure to the metering orifice, hydraulic servo means in or adjacent to the metering valve for varying the area of the metering orifice, a control device having a variable area orifice for control of servo pressure, the device being spaced from the servo means in a direction in which an acceleration will occur during use of the plant, a full-running conduit for conveyance of servo liquid between the servo means and one side of the control orifice, a full-running conduit for conveyance of servo liquid between the other side of the control orifice and a position such that an acceleration in the said direction, by virtue of the combination of its effect on the liquid in the full-running conduits, and its effect, if any, on the servo means, metering valve and control device will change the metering orifice area in the sense necessary to compensate for any change of pressure of fuel arriving at or leaving the metering orifice due to sensitivity, if any, of the means for supplying fuel to the metering orifice or for conveying it from the metering orifice to its place of consumption, to an acceleration in the said direction.

If the means for supplying fuel to the metering orifice and for conveying it from the metering orifice are both insensitive to acceleration in the said direction, then the said position is such that an acceleration in the said direction produces no change in metering orifice area.

A further feature of the invention is the use in a jet propulsion power plant of a fuel system including a piston and a cylinder linear flow valve arranged with its cylinder axis in a direction in which an acceleration will occur during use of the plant, the valve having at least one outlet connected to fuel dispersing means, a fuel pressure controller spaced in the said direction from the linear flow valve and arranged to control the pressure of fuel on the piston in the flow increasing direction, means for establishing and controlling a lower pressure of fuel on the other side of the piston, the linear flow valve being so arranged in respect of the mass and direction of movement of the piston that an acceleration in the said direction by virtue of its effect on the piston will produce an effect on the flow of fuel through the valve which is opposite in sense to the effect on the flow of fuel through the valve due to the spacing of the fuel pressure controller from the valve.

These and other features of the invention will be explained with reference to the accompanying drawing showing schematically in the two figures two power plant arrangements embodying the invention.

FIGURE 1 illustrates in plan a power plant for a missile including a body 1 and a wing 2, the power plant comprising two ramjet engines mounted in the wing on opposite sides of the body, one of these engines being shown at 3 and the other being in a "mirror image" position.

Such a missile would be steered by combinations of rolling movement about its longitudinal axis and change of lift of the wing. The plant is consequently subjected to significant accelerations in the longitudinal direction and perpendicular to the plane of the wing, but spanwise accelerations are negligible, and the rate of roll is not sufficient to produce significant radial accelerations. As, in this plant arrangement, the engines and the equipment carried in the body all lie substantially in the plane parallel to the plane of the wings, accelerations normal to this plane have substantially no effect on the hydraulic systems, and one is left with the necessity to consider the effect of longitudinal accelerations. If all the hydraulic systems could be arranged in a line normal to the longitudinal axis, these longitudinal accelerations also would have no effect upon the systems, but in general this is not practicable, and FIGURE 1 is schemed to show, in a possibly exaggerated manner, the sort of displacements from the ideal positions which can occur, and the manner in which, according to the invention, they are compensated.

The two ramjet engines are illustrated conventionally as comprising an outer casing 4, an island member 5 providing an intake compression spike 6 and connected to the casing by vanes 7, a pilot combustion chamber 8 connected to the island member by vanes 9, a flame holder 10, a pilot fuel jet 11, and a ring-shaped main fuel manifold 12 carrying a number of discharge orifices spaced around it. Air enters the pilot combustion chamber 8 between the vanes 9 as indicated by arrows. Fuel from the main jets burns in the casing downstream of the flame holder 10, and hot gases leave by way of a propulsion nozzle, not shown.

In the body 1 are housed a tank 13 for liquid fuel, and a fuel pump 14 driven by an air turbine 15, receiving air under ram pressure through ducts 16 and a valve 17 from intake openings 18 in the leading edge of the wing. The valve 17 preferably operates partly by throttling the air to the turbine and partly by by-passing air, the used and by-passed air leaving by way of ducts 19 to outlets 20 in the trailing edge of the wing. The pump 14 draws fuel from the tank 13 through a pipe 21 and delivers it into a pipe 22 extending outwards into the island members 5 of the two engines. A branch pipe 23 supplies fuel at pump discharge pressure to a control device 24 for the valve 17, the device 24 also receiving a control signal, for example Rayleigh pressure, through a pipe 25 from a forwardly facing orifice in the tip of a probe 26 mounted on the nose of the body 1. The control device 24 includes means sensitive to the ratio of the two pressures thus supplied to it and acting on the valve 17 to control the speed of the air turbine 15 to maintain this ratio constant. It is known that with an arrangement of this kind the Rayleigh pressure sensed by the probe is approximately proportional to the mass flow of air through the ramjet engines when operating with choked propulsion nozzles. The pressure of fuel in the pipe 22 is thus held approximately proportional to the mass flow of air through the engines, and to maintain a constant air-to-fuel ratio for combustion in the engines it remains to control the flow of fuel from the pipe 22 into each engine in proportion to the fuel pressure. For this purpose a so-called "linear flow" valve 27 is provided, that is to say a valve constructed so that the flow through it is directly proportional to the pressure difference across it. This valve comprises a housing 28 having one or more outlet ports 29 of suitable shape the area of which is controlled by a piston 30 urged forwards against the fuel pressure by a spring 31. For simplicity, only one port 29 is shown and it is connected to the single distribution manifold 12 in the main air passage of the engine. However, a number of such ports may be connected either to different manifolds or to different discharge orifices, the valve 27 then acting as a distributor as well as a flow lineariser.

To allow the speed of the missile to be controlled, and possibly also to allow the fuel flow to be adjusted to compensate for changes of incidence, which affects air flow through the engines, means are provided for varying the pressure on the back of the pistons 30 of the valves 27. For this purpose an orifice 32 is provided in each piston to allow a restricted flow of fuel into the chamber 33 behind it, acting as a servo pressure chamber, and piping 34 leads from these chambers to a variable-area servo pressure control orifice 35. In this example the area of the orifice 35 is controlled by a Machmeter 36 arranged for convenience in the nose of the body 1, where it receives Rayleigh pressure from the orifice in the tip of the probe 26 and substantially static pressure from orifices 37 in the side of the probe, Mach number being approximately proportional to the ratio of these two pressures. The Machmeter is arranged to reduce the area of the orifice 35 when the flight speed exceeds a desired value, so that servo pressure increases in the chamber 33 of each valve 27, thereby partially closing the outlet port 29 and reducing the flow of fuel to the engine. It will be observed therefore that the valve 27 can perform three functions, namely those of a linear flow valve, flow distributor and "turn down" control. If an additional control responsive to incidence is required, this control can act on another variable-area orifice in series or parallel flow with the orifice 35, or it can be arranged to limit the maximum opening of the orifice 35. Since it is not desirable that the fuel flow to the pilot jet 11 should be varied by the turn down control, this jet is supplied through a connection 38 to the pipe 22 not affected by movements of the piston 30. The jet 11 is preferably of a kind having a substantially linear pressure-flow characteristic. The servo pressure chamber 33, piping 34 and control orifice 35 constitute a hydraulic control system using fuel as the working liquid, but the system could obviously be modified to use a different working liquid in a closed circuit, the liquid being supplied, for example, through a restricting orifice into the chamber 33 from a constant-pressure source, and being returned to the source by a pump after passing through the control orifice 35.

Considering the system as so far described from the point of view of the effect of longitudinal accelerations, it will be seen that owing to the servo pressure control orifice 35 being displaced longitudinally from the valve 27, the servo pressure in the valve will differ from that at the orifice 35 by an acceleration-induced head. Furthermore, owing to the longitudinal spacing between the device 24 controlling fuel pump discharge pressure and the valve 27, an error will also be produced in the pressure of fuel arriving at the valve 27, which will have two effects, firstly to alter the position of the piston 30 and therefore the area of the outlet port 29, and secondly to change the pressure drop across the outlet port and therefore the flow through it for a given area. This pressure drop is also changed in the same sense by an acceleration head produced in the pipe leading from the valve 27 to the fuel manifold 12, but as the piston 30 is arranged to move in a direction normal to the direction of flight it is not displaced by the effect of longitudinal acceleration acting on its mass.

The errors can be approximately corrected by providing a return flow pipe 39 from the servo pressure control orifice 35 to a suitably chosen position forward of the valve 27, and by arranging that this pipe remains full of fuel. Preferably the return flow is discharged substantially equally into the air flow passages of the two engines through pressure relief valves 40 which prevent the pipe 39 emptying. With this arrangement, the servo pressure in the chamber 33 is changed by the acceleration head corresponding to the longitudinal distance between the linear flow valve 27 and the relief valves 40, part of this change being used to compensate for the change in pressure drop across the outlet port 29 due to the acceleration heads in the pipe 23 and the pipe from the valve to the fuel manifold 12, and the remainder being used to compensate for the change in fuel pressure on the piston 30 due to the acceleration head in the pipe 23. The acceleration head produced in the remainder of the servo pressure pipe 34, between the transverse planes containing the pressure relief valves 40 and the servo pressure control orifice 35, is approximately compensated by the acceleration head produced in the return flow pipe 39. If the fuel manifold 12, the linear flow valve 27, the control device 24 and the pressure relief valve 40 could all be arranged in the same transverse plane, longitudinal accelerations would be compensated for without any change in metering orifice area.

FIGURE 2 illustrates in elevation a power plant which is generally similar to that in FIGURE 1, but instead of the engines being mounted in the wing they are arranged above and below the plane of the wing on struts 41. Since substantial accelerations occur perpendicular to the wing, the spacing of elements of the plant in this direction necessitates arrangements being made to compensate for pressure heads produced in the fuel control system both by longitudinal accelerations and by accelerations perpendicular to the plane of the wings.

In the arrangement shown, the linear flow valves 27 are arranged so that their pistons 30 move in the longitudinal direction, and they are placed at a longitudinal distance from the plane of the device 24 controlling the delivery pressure of the fuel pump 14 such that the change of pressure of fuel arriving at the valve 27 due to a longitudinal acceleration is approximately compensated for by movement of the piston 30 due to its inertia, but change in pressure downstream of the port 29 due to the longitudinal spacing of the fuel manifold 12 from the valve 27 remains to be compensated for. Each linear flow valve has a separate servo pressure pipe 34 leading to separate variable-area servo pressure control orifices 35 operated by the Machmeter 36, and there are separate return flow pipes 39. Each of these pipes discharges into the engine which is opposite the one from which its supply of servo liquid originated, the discharge being sufficiently forward of the plane of the linear flow valve 27 to provide compensation for the change in pressure downstream of the port 29 referred to above, by moving the piston 30, and preferably through a pressure relief valve 40 to ensure that the pipes remain full of fuel. The longitudinal acceleration heads produced in the pipes 39 and the corresponding parts of the pipes 34 substantially compensate one another.

Assuming that the device 24 controlling pump delivery pressure is on the centre line of the body, an acceleration in the plane of the engines and at right angles to the centre line will cause errors in pressure of fuel arriving at both of the linear flow valves 27 due to the acceleration head in the fuel delivery pipe 22 between the centre line and the respective linear flow valves. This error will of course be in the positive sense for one engine and in the negative sense for the other. Acceleration heads of similar value will also be produced in the respective servo pressure pipes 34, so that these heads will not tend to move the pistons 30, but the first-mentioned heads will cause a change in pressure drop across the outlet ports 29 and consequently a change in flow of fuel to the engines. Further acceleration heads are produced in the return flow pipes 39, and by taking these pipes out to the opposite engine the effect is obtained that these heads move the pistons 30 in the sense to restore the flow of fuel to its correct value. The amount of correction is dependent partly on the distance of the pressure relief valves 40 from the centre line of the body 1, which can be varied within limits of the diameter of the engine air passage, so that although a mathematical analysis may show that exact compensation is not obtainable in this way under all conditions, results can be obtained which are satisfactory in practice.

The linear flow valves 27 can, if desired, be made insensitive to linear accelerations by constructing them as rotary valves, and in that case a correction necessary to compensate, for example, for longitudinal spacing of the linear flow valves from the device 24 controlling pump discharge pressure can be introduced by moving the pressure relief valves 40 an appropriate distance in the longitudinal direction, as in FIGURE 1.

We claim:
1. A jet propulsion power plant comprising a liquid fuel burning engine, a fuel metering valve including relatively movable parts defining a variable area metering orifice, means for supplying fuel under pressure to the metering orifice, hydraulic servo means operating the metering valve for varying the area of the metering orifice, a control device having a variable area orifice for control of servo pressure, the device being spaced from the servo means in a direction in which an acceleration will occur during use of the plant, a full-running conduit for conveyance of servo liquid between the servo means and one side of the control orifice, and a full-running conduit for conveyance of servo liquid between the other side of the control orifice and a position such that an acceleration in the said direction, by virtue of the combination of its effect on the liquid in the full-running conduits, and its effect, if any, on the servo means, metering valve and control device, will change the metering orifice area in the sense necessary to compensate for any change of pressure of fuel arriving at or leaving the metering orifice due to sensitivity, if any, of the means for supplying fuel to the metering orifice or for conveying it from the metering orifice to its place of consumption, to an acceleration in the said direction.

2. A power plant according to claim 1 in which the means for supplying fuel to the metering orifice and for conveying it from the metering orifice are both insensitive to acceleration in the said direction, and thus the said position is such that an acceleration in the said direction produces no change in metering orifice area.

3. A power plant according to claim 1 laid out substantially in a single plane.

4. A power plant according to claim 1 in which fuel is used as the servo liquid.

5. A power plant according to claim 4 in which the fuel metering valve is a linear flow valve.

6. A power plant according to claim 4 in which there is a passage for flow of fuel from the fuel metering valve into the servo means, and at the said position fuel which has been used as working fluid in the servo system is discharged from the servo system into the engine.

7. An aircraft including a power plant according to claim 1 and subject in operation to acceleration in one direction, in which the means for supplying fuel under pressure includes a fuel pressure controlling device, and the said position and the place of consumption of the fuel are displaced oppositely in the said direction from the fuel pressure controlling device.

8. An aircraft according to claim 7 in which the fuel metering valve is insensitive to acceleration in the said direction.

9. An aircraft including a power plant according to claim 6, in which there are two engines spaced on opposite sides of a fuel pressure controlling device common to them, each engine having an associated servo system arranged to discharge fuel, which has been used as working fluid, into the other engine.

10. An aircraft according to claim 9 in which the aircraft has a lifting surface and in which the two engines are spaced apart in a direction perpendicular to the plane of the lifting surface.

11. A power plant according to claim 6 in which the discharge of fuel from the servo system is through a pressure relief valve.

12. A jet propulsion power plant including a liquid fuel burning engine and a fuel system therefor including a piston and cylinder linear flow valve arranged with its cylinder axis in a direction in which an acceleration will occur during use of the plant, the valve having at least one outlet connected to fuel dispersing means, a fuel pressure controller spaced in the said direction from the linear flow valve and arranged to control the pressure of fuel on the piston in the flow increasing direction, means for establishing and controlling a lower pressure of fuel on the other side of the piston, the linear flow valve being so arranged in respect of the mass and direction of movement of the piston that an acceleration in the said direction by virtue of its effect on the piston will produce an effect on the flow of fuel through the valve which is opposite in sense to the effect on the flow of fuel through the valve due to the spacing of the fuel pressure controller from the valve.

13. A power plant according to claim 12, including a pipe system connected to the space on the said other side of the piston having a portion extending in the said direction wherein a change of pressure will be produced by acceleration in the said direction and conveyed to the said other side of the piston, which change of pressure is of such sense as to adjust the valve for a change of flow in opposition to a flow changing effect produced by the acceleration acting in another part of the fuel system.

References Cited in the file of this patent
UNITED STATES PATENTS

| | | |
|---|---|---|
| 2,538,606 | Udale | Jan. 16, 1951 |
| 2,637,273 | Stokes | May 5, 1953 |
| 2,936,974 | Shaw | May 17, 1960 |